March 3, 1964  E. R. BEEBE  3,123,704
ARC WELDING APPARATUS
Filed Aug. 10, 1961  5 Sheets-Sheet 1

INVENTOR.
Emmett R. Beebe,
BY
Robert R. Lockwood
Atty

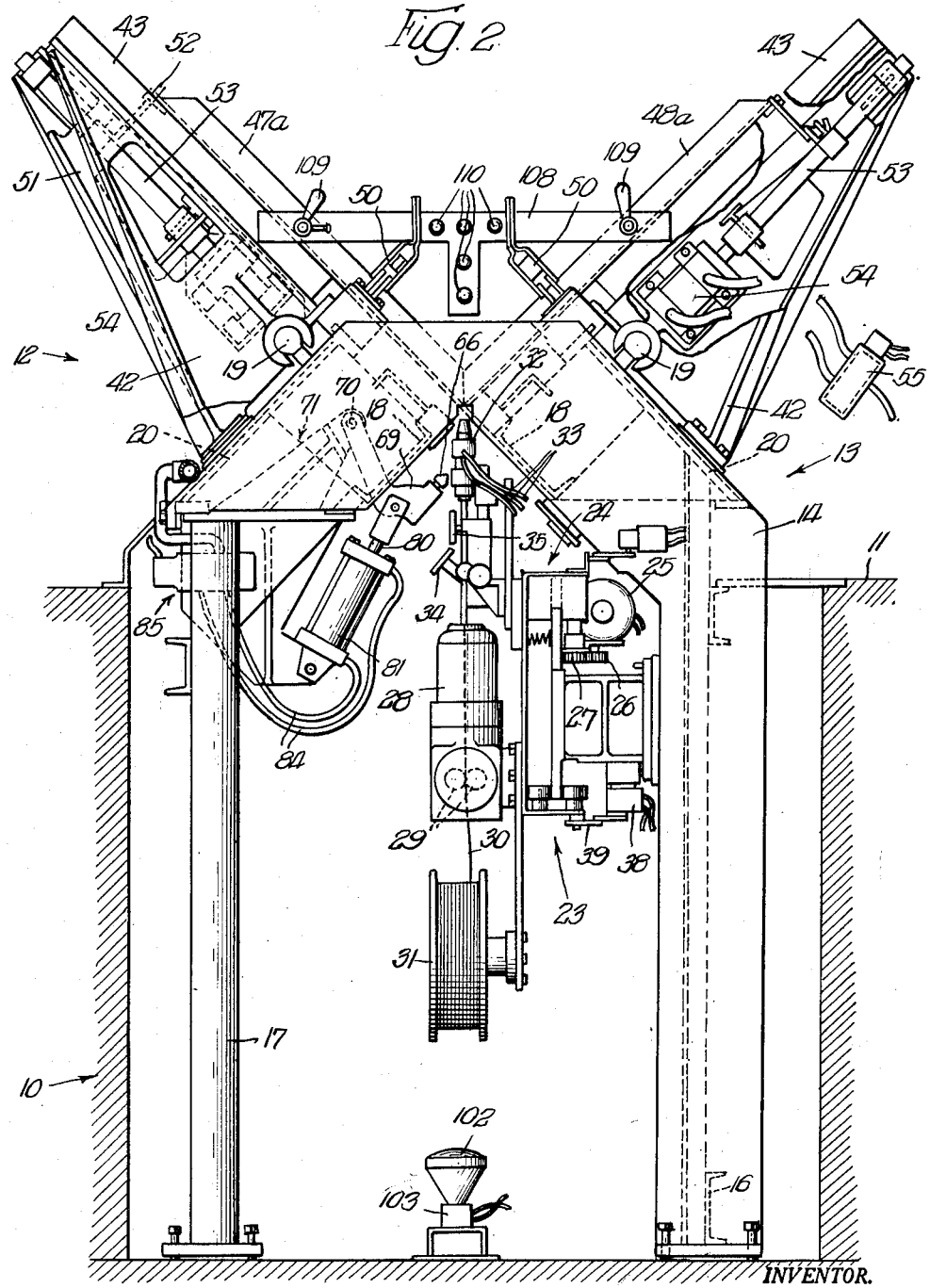

March 3, 1964  E. R. BEEBE  3,123,704
ARC WELDING APPARATUS
Filed Aug. 10, 1961  5 Sheets-Sheet 3
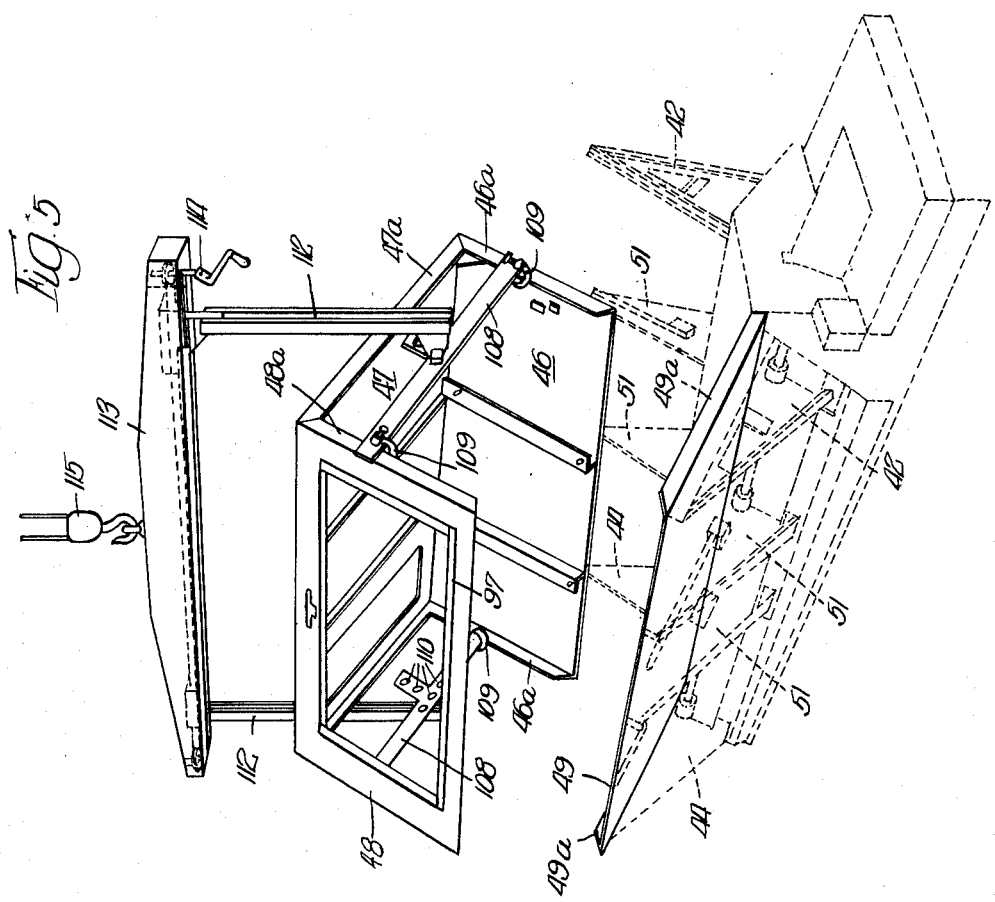
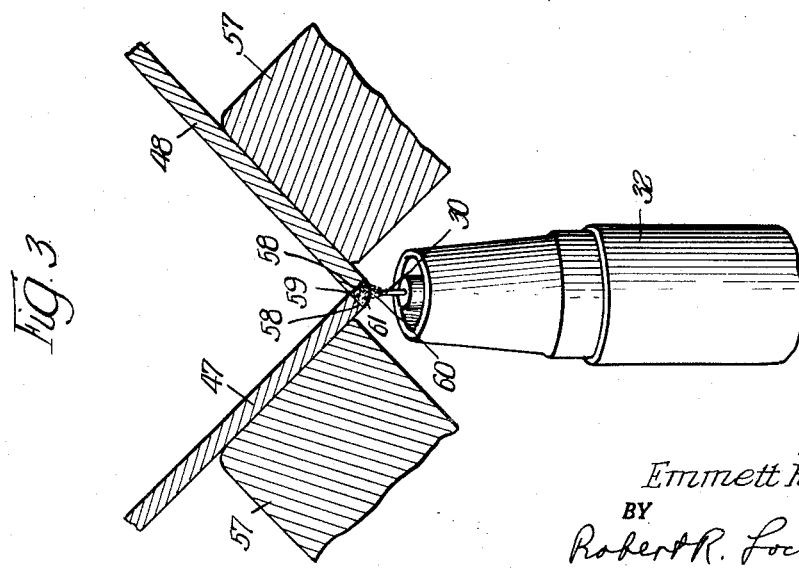
INVENTOR.
*Emmett R Beebe,*
BY
*Robert R. Lockwood*
ATTY

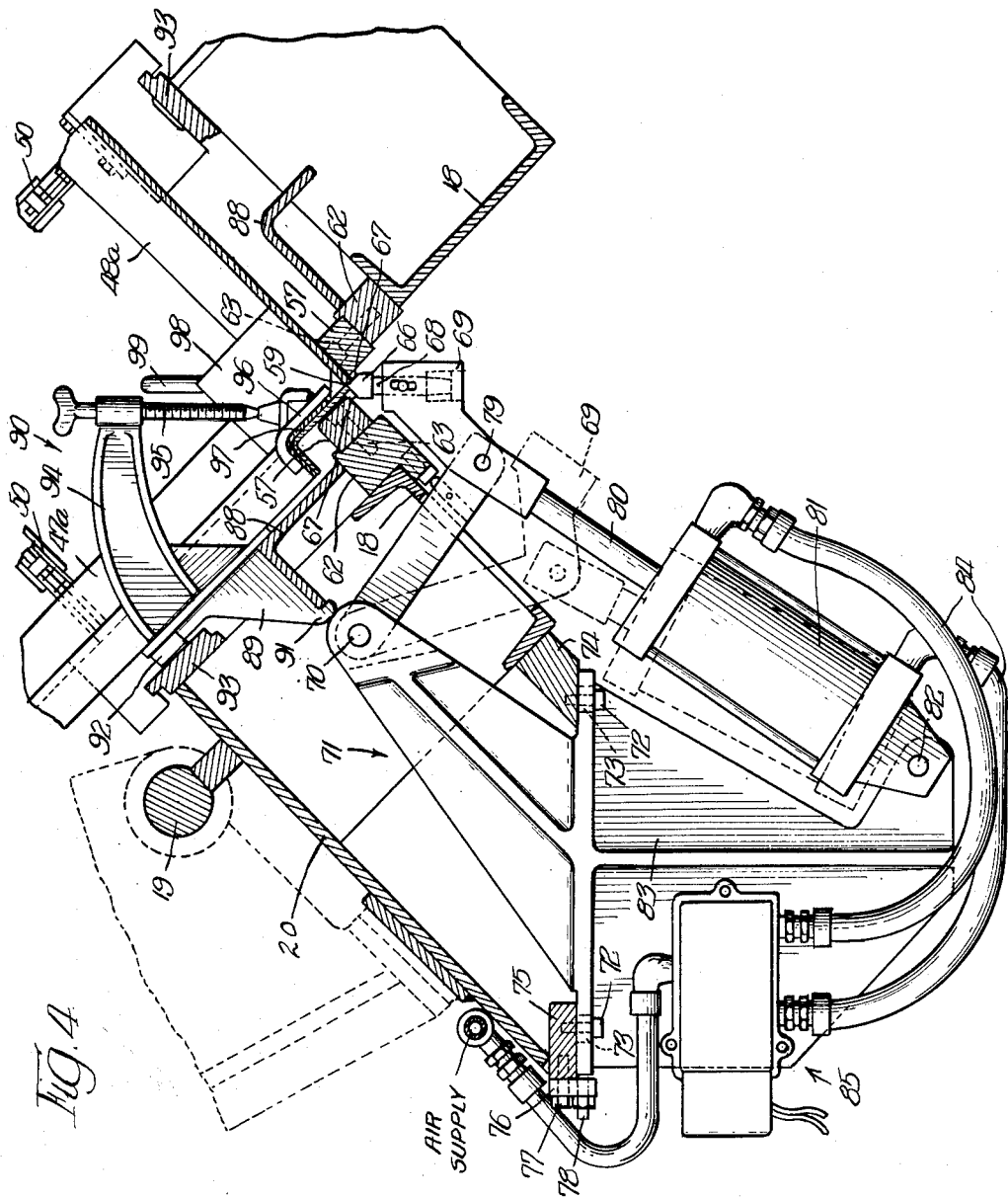

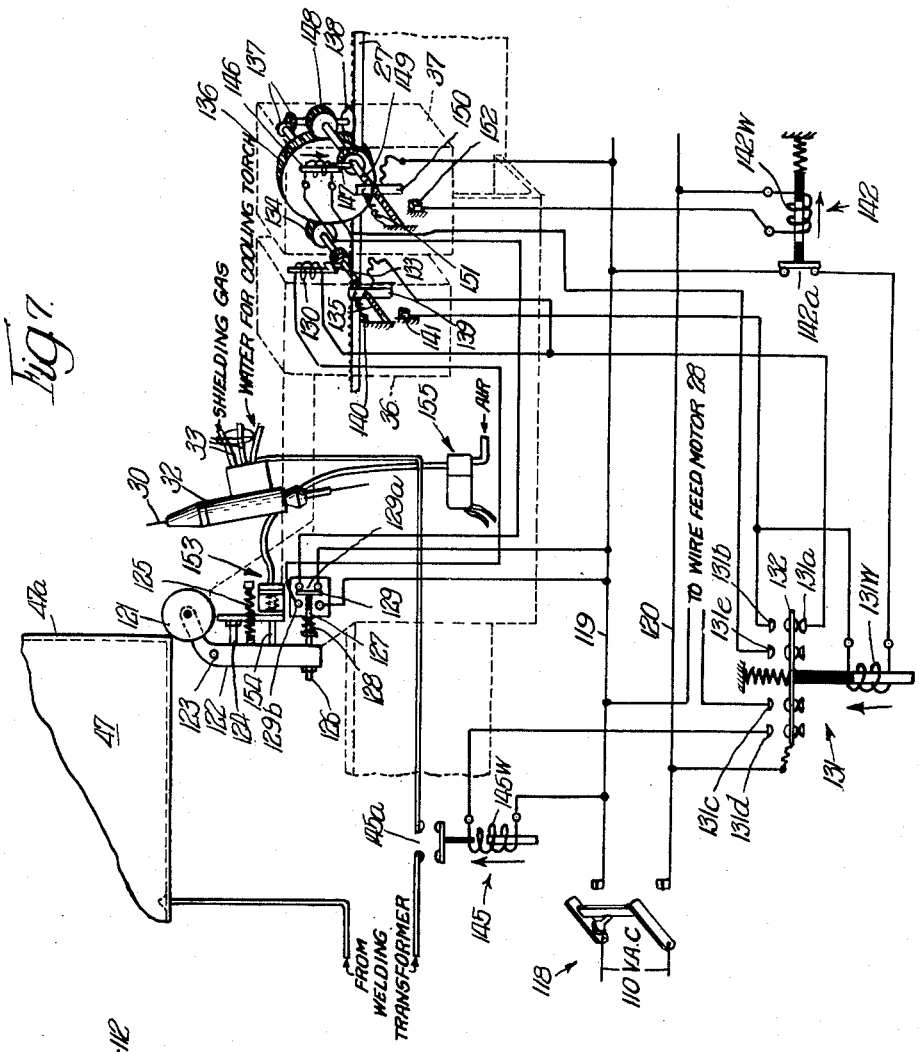

United States Patent Office 3,123,704
Patented Mar. 3, 1964

3,123,704
ARC WELDING APPARATUS
Emmett R. Beebe, Glenview, Ill., assignor to S & C Electric Company, Chicago, Ill., a corporation of Delaware
Filed Aug. 10, 1961, Ser. No. 130,582
7 Claims. (Cl. 219—125)

This invention relates, generally, to welding and it has particular relation to arc welding of the juxtaposed edges of plates assembled to form a housing such as a four sided housing for metal clad switchgear. More particularly this invention relates to a method of and means for positioning, clamping, handling and joining, by consumable electrode arc welding the four sides of an enclosure which is substantially rectangular and made of metal sheets such as steel of about eleven gauge or 1/8" thick. The thickness is variable as will be understood and the enclosure sizes are variable to range in width and depth about 9' to 25' and in length from 5' to 12'.

The object of the invention, generally stated, is to provide a simple means for positioning two adjacent side sheets or side sheet assemblies which are large, limber, heavy and relatively difficult to maintain in alignment. Each sheet is provided with miscellaneous stiffeners, studs, brackets, openings, flanges, louvers and the like which are pre-assembled or pre-formed on the sheet in an unpredictable array of positions such that the use of conventional clamping means would be difficult.

A more specific object of this invention is to join two adjacent sheets or metal side plates or sheets by consumable electrode gas (inert and compound gases) shielded arc welding means at the intersection of the abutted edges to form a fillet weld on the outside corner having at least 100% penetration on the weld and with the weld contour tangent to the outside surfaces of the juxtaposed sheets. When this is accomplished in accordance with this invention it is unnecessary to employ subsequent cleaning and shaping operations along the welded area prior to applying the usual finish to the completed enclosure.

A further object of the invention is to provide for inverting the fixturing and welding operation from what is considered to be the normal welding position when the type of welding above referred to is employed. An important advantage of this invention is that the sheet assemblies are supported on their outside faces and gravity is employed initially in holding them in the desired abutted relationship. When this arrangement is employed there are no height limitations on the assemblies that are being welded. Employing such an arrangement of the sheets, a unique application of metal transfer type welding is employed.

Still another object of the invention is to provide for automatically welding the juxtaposed sides of the sheets together in such manner that when they are properly positioned and clamped, the operator need only start the welding cycle, the welding operation and the return of the welding apparatus to the start position thereupon being entirely automatic.

Still another object of the invention is to provide movable stop gauges which accurately and precisely position the planar side portions of the sheets to be welded together and rigidly hold them in this position while providing electrically controlled operating means for moving the stop gauges out of operative position one by one in synchronism with the movement of the automatic welder so that its operation is not interfered with.

Other objects of this invention will, in part, be obvious and in part appear hereinafter.

In the drawings:

FIG. 2 is a vertical elevational view of the device shown in FIG. 1.

FIG. 3 is a sectional view, at an enlarged scale, showing the relationship between the juxtaposed sheet metal plates positioned for inverted fillet welding and showing how the weld metal is deposited from underneath employing the welding torch described hereinafter.

FIG. 4 is a vertical sectional view taken inside the J-shaped end support member shown in FIG. 1 and showing at a slightly enlarged scale the manner in which the gauge block is applied and removed together with an illustration of special clamp mechanism for a particular shape of sheet metal plate.

FIG. 5 is a perspective view showing how the partially completed enclosure is handled and arranged to be rotated about a generally horizontal axis from one position to another.

FIG. 6 is a fractional view at an enlarged scale showing how one of the T-shaped handling bars is mounted on a pivot carried by a lifter arm which forms a part of the handling mechanism.

FIG. 7 illustrates diagrammatically certain of the electric circuit connections that are employed in practicing this invention.

Figure 1:
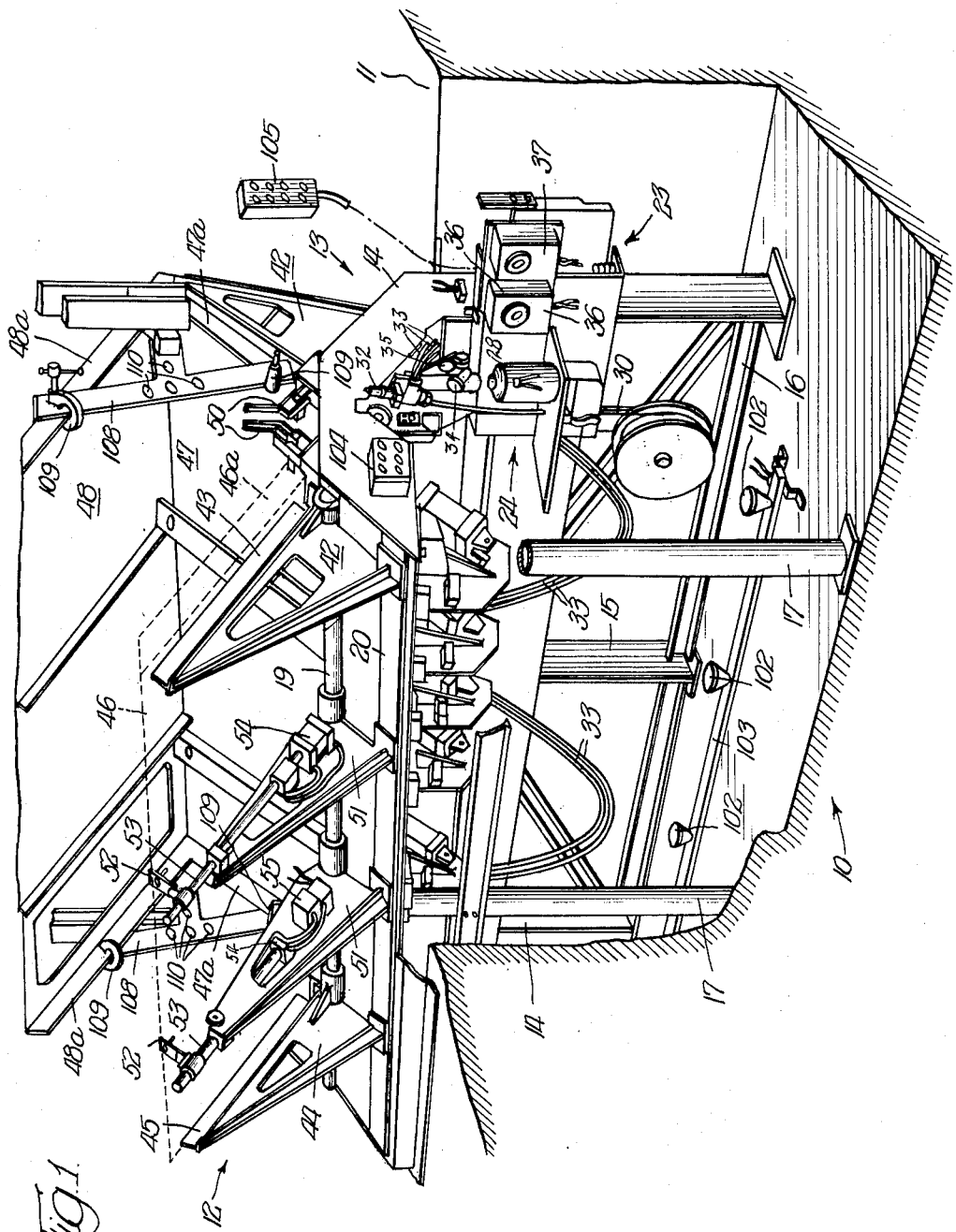
FIG. 1 is a perspective view of a preferred embodiment of the inverted fillet welding fixturing device located in a pit with a major portion below ground level.

Referring now particularly to FIGS. 1 and 2 of the drawings, it will be observed that the reference character 10 designates, generally, a pit that is located below ground level 11 for the purpose of receiving the inverted fillet welding fixturing device, shown generally at 12, in which the present invention is embodied. Preferably the device 12 is positioned in the pit 10 to facilitate handling of the metallic sheets or plates that are to be welded as will be set forth hereinafter.

The inverted fillet welding fixturing device 12 includes a frame that is indicated, generally, at 13. The frame 13 includes inverted J-shaped end support members 14—14 and an intermediate support member 15 all interconnected by a channel brace 16. Removable supporting legs 17—17 are provided on the opposite side of the pit 10. Extending lengthwise of the frame 13 are channel frame members 18—18 which are shown more clearly in FIG. 4. Also extending lengthwise of the frame 13 are stationary frame shafts 19—19 and below and outwardly thereof are lengthwise extending frame plates 20—20.

Mounted below the ground level 11 and principally on the end support members 14—14 and the intermediate member 15 is a lengthwise extending monorail assembly that is indicated, generally at 23. Movably mounted on the monorail assembly 23 is a traveling carriage, shown generally at 24, it being understood that suitable support and guide rollers are provided to facilitate movement of the traveling carriage 24 along the monorail assembly 23. It is driven therealong by a reversible carriage drive motor 25 that is arranged to rotate a pinion 26 through a suitable gear reduction mechanism, the pinion 26 engaging a lengthwise extending rack 27 that is mounted on the monorail assembly 23. It will be understood that, on energization of the reversible carriage drive motor 25 in one direction or the other, the pinion 26 is rotated to move the carriage 24 in one direction or the other along the monorail assembly 23. Also mounted on the traveling carriage 24 is a welding wire drive motor 28 together with its gear reduction assembly through which drive rollers 29—29 are driven for withdrawing a welding wire 30 from a reel 31 that is rotatably mounted on the traveling carriage 24. The welding wire 30 is fed to a welding torch 32 that is directed generally upwardly. The welding torch 32 is of the arc welding, gas shielded, water cooled type. For this purpose conventional water, welding current and gas lines, collectively indicated at 33, are provided for the purpose of cooling the torch, supplying welding current to the welding arc and blanketing the arc with a gas, such as argon or a gaseous compound such as carbon dioxide or mixtures of these gases, in known manner. A hand wheel 34 is provided for changing the elevation of the torch 32 while its horizontal position is adjusted by a hand wheel 35.

In order to determine when the welding operation should begin a measuring relay 36 is provided. It will be pointed out hereinafter how the measuring relay 36 is arranged to start the welding operation at the proper time in relation to the movement of the welding torch 32 along the monorail assembly 23. Another measuring relay 37 is provided alongside the measuring relay 36 and both are mounted on the traveling carriage 24, the second measuring relay 37 being arranged to stop the welding operation at the proper time after the welding bead has been completely laid down.

Mounted on the lower side of the monorail assembly 23, FIG. 2, is a series of gauge block switches one of which is indicated at 38. As pointed out hereinafter a number of gauge blocks are employed and each gauge block switch includes normally closed contacts that are arranged to be opened by a gauge block cam 39 which moves with the traveling carriage 24 the purpose being to operate each gauge block switch 38 in synchronism with the movement of the welding torch 32 in order to move each gauge block out of interfering relation with respect to the welding torch 32 as it moves along the monorail assembly 23 in performing the welding operation.

Referring now to the upper side of the frame 13, it will be observed that inverted generally V-shaped stationary end support arms 42—42 are provided and are mounted at their lower ends on the stationary frame shafts 19—19 and on the frame plates 20—20. The end support arms 42—42 are provided with generally upwardly extending support flanges 43—43 the upwardly facing support surfaces of which extend at right angles to each other and the projections of which would intersect at right angles. At the far end of the frame 13 are slidable end support arms one of which is shown at 44 in FIG. 1. It has a support flange 45 that has an upwardly facing supporting surface which is in the same plane as the supporting surface of the support flange 43 located on the end support arm 42 on the same side of the frame 13. The support arm 44 is slidable on the frame shaft 19 and adjacent frame plate 20 to accommodate different lengths of sheet metal plates as will be understood readily.

In FIG. 1 a sheet metal plate 46 is shown by broken lines as overlying the support flanges 43 and 45 on the support arms 42 and 44, respectively. The sheet metal plate 46 can be considered as a third plate, the second and first sheet metal plates being indicated, respectively, at 47 and 48 and shown as having been welded together along their juxtaposed sides in a manner to be described in more detail hereinafter. In order to complete the enclosure there is a fourth sheet metal plate that is indicated at 49 in FIG. 5. It will be understood that the sheet metal plates 46, 47, 48 and 49 are successively positioned with the juxtaposed edges facing downwardly along which the welding operation is performed. As a pair of the sheet metal plates is welded together, they are moved as a unit through approximately 90° in a manner to be described for receiving the next sheet metal plate until the enclosure has been completely assembled and welded along its four corners. It will be observed that the ends of the sheet metal plates 46, 47, 48 and 49 are provided, respectively, with end flanges 46a—46a, 47a—47a, 48a—48a and 49a—49a. These end flanges extend at right angles to the main portions of the respective sheet metal plates and advantage is taken of their presence for handling the sheet metal plates as they are assembled.

It is essential that the sheet metal plates be securely and accurately positioned on the inverted fillet welding fixturing device. For this purpose toggle action end clamps 50—50 are provided at each end. As indicated in FIG. 1, the set of toggle action end clamps 50—50 there shown is employed for engaging the adjacent end flanges 46a and 47a to hold the sheets 46 and 47 in operative position on the support flanges 43—43 and in like manner similar toggle action clamps are provided at the other end for the same purpose. In addition, a pair of slidable side clamp assemblies 51—51 is provided along each of the stationary frame shafts 19—19 and they are adjustable in accordance with the length of the sheet metal plates mounted on the welding fixturing device 12. The slide clamp assemblies 51—51 are provided with laterally extending clamp fingers 52—52 for overlying the uppermost edges of the metal plates mounted on the support arms 42 and 44 on each side. The clamp fingers 52—52 extend laterally from slidable shafts 53—53 that are arranged to be operated by pneumatic operators 54—54 that are arranged to be electrically controlled and for this purpose solenoid operated air valves 55 are provided, one for each of the pneumatic operators 54—54. It will be understood that there are two pairs of pneumatic operators 54—54, one pair on each side of the welding fixturing device 12 and that the solenoid operated air valves 55 individual to the respective operators can be energized to move the clamp fingers 52—52 into or out of clamping engagement as the case may be.

Referring now particularly to FIG. 3 of the drawings, portions of the second and first sheet metal plates 47 and 48 are there shown at an enlarged scale to illustrate more clearly how the welding operation is performed from underneath. Here it will be observed that the metal plates 47 and 48, which may have a thickness of 1/8" or more, extend preferably at right angles to each other and are in engagement on their undersides with back up bars 57—57 of good thermal and electrical conducting metal such as copper. The back up bars 57—57 extend lengthwise of the frame 13 and their upper faces are inclined in planes at right angles to each other conforming to the desired angular position of the sheet metal plate 47 with respect to the sheet metal plate 48. Now it will be observed that the sheet metal plates 47 and 48 are provided with planar side portions 58—58 that face downwardly and preferably they are at right angles to each other. However, it will be understood that this angular relationship can be varied somewhat. Also it will be observed that the juxtaposed edges 59 of the plates 47 and 48 form the apex of the space whose sides are defined by the planar side portions 58—58. A welding arc 60 is maintained between the upper end of the welding wire or electrode 30 and an inverted fillet weld metal 61 that is formed, in part, from the welding wire 30 and in part from the metal of the plates 47 and 48.

Referring now particularly to FIG. 4 of the drawings, it will be observed that the back up bars 57—57 extend along support bars 62—62 which are carried by the channel frame members 18—18. Counter sunk bolts 63—63 extend through the back up bars 57—57 into the support bars 62—62 to hold the former securely on the latter.

FIG. 4 shows at 66 one of the gauge blocks that is provided for accurately positioning the planar side portions 58—58 of the plates 47 and 48 or similar plates when they are positioned to be welded together as shown in FIG. 3. A number of gauge blocks 66 is employed. For example, eight gauge blocks 66 and associated operated equipment can be employed and some or all of them used, depending upon the length of the sheet metal plates 47 and 48.

As shown in FIG. 4 each gauge block 66 is provided with gauge surfaces 67—67 that are positioned in planes at right angles to each other, if it is desired that the planar side portions 58—58 be similarly positioned. It will be observed in FIG. 4 that the planar side portions 58—58 engage the gauge surfaces 67—67 when their their edges 59 are juxtaposed. Each gauge block 66 is mounted at the upper end of a depending shank 68 that is adjustably mounted in an L-shaped support bracket 69 which is pivoted at 70 on a gauge block frame member that is shown, generally, at 71. The position of each gauge block frame member 71 can be adjusted slightly transversely by loosening bolts 72—72 that extend through slotted openings 73—73 a mounting flange of gauge block frame member 71 and threaded into tapped holes provided in a longitudinal frame member 74 that is secured to the adjacent channel frame member 18 and a longitudinal frame member 75 to which an adjusting screw block 76 is secured by a bolt 77. An adjusting screw 78 is provided for cooperating with the gauge block frame member 71 when the bolts 72—72 are loosened for positioning it in the proper location on the frame 13.

In order to change the position of the L-shaped support bracket 69, it is pivotally connected at 79 to the upper end of a piston rod 80 that is controlled by a pneumatic operator 81 that is pivoted at 82 on a depending arm 83 of the gauge block frame member 71. Air hoses 84—84 serve to interconnect the opposite ends of the cylinder of the pneumatic operator 81 to a solenoid operated air valve 85 that is under the control of the gauge block switch 38, previously described, the arrangement being such that, as the welding torch 32 moves along the planar side portions 58—58 to deposit the weld metal 61 in the manner described, the next gauge block 66 is moved out of the path of the welding arc 60 by suitable timed operation of the solenoid operated air valve 85 which, in turn, controls the operation of the pneumatic operator 81.

Special clamp means can be employed when the sheet metal plate to be incorporated in the enclosure is provided with an opening therein such as illustrated in FIG. 4. Here it will be observed that the angle shaped clamping bars 88—88 extend lengthwise of the frame 13 and form a part thereof. Advantage is taken of this construction to provide a clamp base 89 on a clamp, shown generally at 90, the clamp base 89 having a tongue 91 that interfits with an edge of a side flange of one of the angle shaped clamping bars 88. Also the clamp 90 has a part 92 that bears against one of a pair of clamp base slides 93 that also extend lengthwise of the frame 13. Upstanding from the clamp base 89 is an arm carrying a clamp screw 95 having at its lower end a clamping adapter 96 which is shaped especially to overlie a section 97 of sheet metal plate that forms a frame for an opening.

While the various sheet metal plates forming the enclosure are shown as being flat throughout, experience indicates that this is not the case and that there is a tendency for them to be somewhat undulating in character and to be positioned slightly out of contact for part of their lengths with the back up bars 57—57. In order to overcome this tendency one or more weights, such as the weight 98, can be positioned along the juxtaposed edges 59 of the plates in welding position as shown in FIG. 4. A handle 99 is located on the upper side of each weight 98 to facilitate removing it or placing it in position.

As noted, the sheets to be welded may not be flat and thus the juxtaposed edges 59 may not always be in contact as illustrated in FIG. 3 for example. It is desirable that simple and efficient means be provided for detecting whether these edges 59 are in juxtaposed relation. For this purpose spot lights 102, FIG. 1, are located on a light bar 103 that extends along the bottom of the pit 10 and, on energization thereof, it is a simple matter for the operator to determine by inspection whether the edges 59 actually are in the desired juxtaposed relation. If they are not, then weights, such as the weight 98, can be applied or additional pressure can be applied by the clamp fingers 52—52 on operation of the pneumatic operators 54—54 or other steps can be taken to insure that the edges 59 are in the proper juxtaposed relation with the planar side portions 58—58 in the relationship shown in FIG. 3 to insure that the inverted fillet weld metal 61 will be deposited and appear essentially as shown here.

Suitable remote control buttons are provided to permit the operator to control various functions of the inverted fillet welding fixturing device 12. For example, push button controls boxes 104 and 105 are provided at one end of the frame 13. Control box 104 comprises one push button to energize the main secondary control circuit of fixture 12; one push button to deenergize said control circuit; one push button to simultaneously activate all gauge block pneumatic operators 81 to extend gauge blocks 66 into operating position; one push button to activate same out of operating position; one pair of push buttons to extend and retract welding electrode wire 30 by activating wire drive motor 28 in forward and reverse rotation respectively. The latter controls are necessary to feed a new spool of wire through torch 32 and for normal service and adjustment operations. Control box 105 serves as an operating center for the following functions of fixture 12 comprising one three position selector switch for separate selection of automatic, manual and skip welding operations; one cycle start push button to start automatic welding and automatic skip welding cycles; one stop button to stop automatic welding and automatic skip welding operations; one push button each to effect forward and reverse motion of the carriage 24 along monorail assembly 23 for selective positioning with selector in manual; four two position switches to activate separately the pneumatic operators 54 on each of the slidable side clamp assemblies 51—51, FIG. 1.

An important feature of the present invention is the provision of means for handling the sheet metal plates after each welding operation has been completed. As shown in FIG. 2 the sheet metal plates 47 and 48 are assumed to have been welded together along their juxtaposed planar side portions. After the welding operation has been completed, T-shaped handling bars 108—108 are secured by clamps 109—109 of generally C-shape to the end flanges 47a and 48a. It will be understood that a T-shaped handling bar 108 is so positioned at each end of the welded sheets 47 and 48. Now it will be observed that each of the T-shaped handling bars 108 is provided with several openings 110 in the top of the T-shape and also in the stem. They are provided for receiving pivot members, such as the pivot member 111, FIG. 6, which extend toward each other from lifter arms 112, FIG. 5, that depend from a lifting spreader or yoke 113. It will be understood that adjusting means are mounted on the lifting spreader or yoke 113 under the control of a crank 114 to permit movement of the lifter arms 112 toward or away from each other in order to accommodate various lengths of sheet metal plates as the case may be. An overhead hoist means 115 secured to the upper side of the lifting spreader or yoke 113 permits the latter to be raised and lowered as will be understood readily.

In operation, after the welding operation has been completed to secure the sheet metal plates 47 and 48 together, as shown in FIG. 2, the T-shaped handling bars 108 are securely mounted to the respective end flanges 47a and 48a by the C-clamps 109—109. Then the toggle action end clamps 50—50 are released and also the pneumatic operators 54—54 are energized through the respective solenoid operated air valves 55 to release the clamp fingers 52—52. Now the metal sheets 47 and 48 can be lifted by application of the pivot members 111 to the T-shaped handling bars 108—108 and operation of the overhead hoist means 115. Not only are the two sheets 47 and 48 lifted vertically, but also they can be turned about an axis that is generally parallel to the axis of the juxtaposed welded edges 59 so that the two sheets 47 and 48 can be rotated to the position shown in FIG. 1 where the sheet 48 is uppermost, while the sheet 47 is in position to be welded to the sheet 46. Thus in FIG. 1 the first sheet metal plate 48 has been welded to the second sheet metal plate 47 while the third sheet metal plate 46 is next to be welded to the second sheet metal plate 47. In FIG. 5 it will be observed that the first, second and third sheet metal plates have been welded together and that they have been rotated by the handling means to position the third sheet metal plate 46 just above the operative position on the welding fixturing device 12 in proper relation to the fourth sheet metal plate 49 for the purpose of welding it to the juxtaposed edge of the third sheet metal plate 46. After this operation has been completed, the four sheet metal plates are then welded together at three corners and the operation is repeated to bring the unwelded juxtaposed edges into welding position on the welding fixturing device 12 where the assembly is clamped in the manner described and the welding operation is performed.

Referring now particularly to FIG. 7 of the drawings, it will be observed that certain of the circuit connections are shown for controlling the starting and stopping of the welding operation. Since the control of the reversible carriage drive motor 25 is conventional, it will not be described. It will be understood that the reversible carriage drive motor 25 is energized in a suitable manner to drive the traveling carriage 24 forwardly along the monorail assembly 23 for starting, continuing and stopping the welding operation. In addition suitable controls are provided for reversing the carriage drive motor 25 to return the traveling carriage 24 along the monorail assembly 23 to the starting position.

It will be assumed that the carriage drive motor 25 has been energized and that the traveling carriage 24 is moving toward the sheet metal plates 47 and 48, for example, as shown in FIG. 2, to perform the welding operation. Also it will be assumed that a double pole control switch 118 has been closed for the purpose of energizing conductors 119 and 120 from a suitable current source such as 110 volt alternating current source. Upon movement of the traveling carriage 24 sufficiently far, a pickup wheel 121 engages the joint between the sheet metal plates 47 and 48 and it is depressed. The pickup wheel 121 is rotatably mounted on an arm 122 that is pivoted at 123 on the traveling carriage 24. When the pickup wheel is depressed and the arm 122 rotated in a clockwise direction, the arm 122 moves away from an adjustable stop 124 and tensions a return spring 125. The movement of the arm 122 is accompanied by a movement of an adjustment screw 126 out of engagement with a contact stem 127 that is biased by a spring 128 to move a contact bar 129 out of bridging engagement with contacts 129a and into contact engagement with contacts 129b. This action completes a circuit for energizing a solenoid 130 which can be traced from energized conductor 119 through contacts 129b, solenoid 130, contact 131a of a control relay, shown generally at 131, contact bar 132 of this relay, to the other energized conductor 120. As a result of the energization of a solenoid 130 a clutch 133 is operated to place a pinion 134 in driving engagement with a measuring shaft 135 that forms a part of the measuring relay 136 which is employed for starting the welding operation. The pinion 134 is driven by a gear 136 which is driven through bevel gears 137 by a pinion 138 that has driving engagement with the lengthwise rack 27. It will be understood that, as the traveling carriage 24 moves along the monorail assembly 23, the pinion 138 is rotated to effect rotation of the gear 136 and pinion 134. As a result of the operation of the clutch 133, the rotation of the pinion 134 causes rotation of the measuring shaft 135. This action causes a contact finger 139 to move along the measuring shaft 135, compress a spring 140 and finally engage a stationary contact 141. The time required for moving the contact finger 139 into engagement with the stationary contact 141 is adjusted to correspond to the time required after the pickup wheel 121 has been depressed until the welding torch 32 has been moved into a position where the welding wire 30 can engage the joint between the metal plates 47 and 48 at the beginning of the weld at which time it is desired that the welding operation be initiated. The engagement of the contact finger 139 with the stationary contact 141 completes a circuit for energizing the operating winding 131w of the control relay 131. This circuit can be traced from the energized conductor 119 through normally closed contacts 142a of a control relay, shown generally at 142, winding 131w, stationary contact 141, contact finger 139, contact 131a, contact bar 132 to the other energized conductor 120. As a result of the energization of the operating winding 131w, the contact bar 132 is moved to the alternate position opening the circuit to contact 131a and deenergizing the solenoid 130. The clutch 133 is disengaged and the spring 140 returns the contact finger 139 to its initial position. A holding circuit is completed for the operating winding 131w through contacts 131b to the energized conductor 120. At contact 131c an obvious energizing circuit is completed to the wire feed motor 28 and it starts to feed the welding wire 30 toward the joint to be welded. At contacts 131d an obvious energizing circuit is completed for operating winding 145w of a welding contactor, shown generally at 145. Its contacts 145a are closed to complete a circuit for supplying welding current from a welding transformer to the welding torch 32. As the traveling carriage 24 moves along the monorail assembly 23, the welding operation is performed in the manner described. The shielding gas and water for cooling the torch 32 are supplied as the torch 32 moves along the joint between the metal plates 47 and 48, for example, to facilitate performance of the welding operation.

Near the end of the welding operation along the joint between the metal plates 47 and 48, for example, the pickup wheel 121 moves beyond them and the spring 125 swings the arm 122 back to the initial position against the adjustable stop 124. The adjustment screw 126 then engages the contact stem 127, compresses the spring 128 and shifts the contact bar 129 to bridge the contacts 129a. As a result of this operation an energizing circuit is completed for energizing a solenoid 146 which can be traced from the energized conductor 119 through contacts 129a, solenoid 146, contacts 131e of control relay 131, contact bar 132 back to the other energized conductor 120. The energization of the solenoid 146 operates a clutch 147 to place a pinion 148 in driving engagement with a measuring shaft 149 that forms a part of the measuring relay 137 for stopping the welding operation. The pinion 148 is driven by the gear 136 which, it will be recalled, is driven from the pinion 138 in engagement with the lengthwise rack 27. The rotation of the measuring shaft 149 causes a contact finger 150 to move therealong, compress a spring 151 and finally engage a stationary contact 152. The time required for moving the contact finger 150 into engagement with the stationary contact 152 is adjusted to correspond to the time required after the pickup wheel 121 has been restored to its initial position on leaving the sheet metal plates 47 and 48, for example, to permit the welding torch 32 to be moved to the end of the joint and complete the welding operation. On engagement of the stationary contact 152 by the contact finger 150 an obvious energizing circuit is completed for the operating winding 142 of the control relay. Its contacts 142a are opened and the energizing circuit for the operating winding 131w is opened with the result that its contact bar 132 is returned to the initial position. At contact 131e the previously traced energizing circuit for the solenoid 146 is opened and it is deenergized. The clutch 147 is disengaged and the spring 151 returns contact finger 150 to its initial position. At contacts 131c and 131b previously indicated energizing circuits are opened, the wire feed motor 28 is deenergized and the operating winding 145w of the welding contactor 145 also is deenergized. Contacts 145a of the welding contactor 145 are opened and welding current ceases the flow to the torch 32 and the welding wire 30 no longer is fed by the feed motor 28.

By means of a suitable limit switch the carriage drive motor 25 is reversed and the traveling carriage 24 is returned along the monorail assembly 23 to the initial position.

It is desirable that the pickup wheel 121 be depressed when the traveling carriage 24 is returned. For this purpose a pneumatic operator 153 is provided having a piston rod 154 that can be extended on operation of a solenoid operated air valve 155 to rotate the arm 122 in a clockwise direction. This lowers the pickup wheel 121 so that it does not engage the metal plates 47 and 48, for example, when the traveling carriage 24 is returned to the starting position.

What is claimed as new is:

1. Apparatus for arc welding together the juxtaposed edges of a pair of metallic sheets comprising, in combination, means for supporting the sheets in angular relation with their juxtaposed edges facing downwardly, track means extending along said juxtaposed edges of said sheets, and an automatic arc welding head movably mounted on said track means underneath said supporting means and arranged and adapted to feed a consumable welding electrode upwardly toward said juxtaposed edges to deposit weld metal therealong.

2. Apparatus for arc welding together the juxtaposed edges of a pair of metallic sheets comprising, in combination, means for supporting the sheets in angular relation with their juxtaposed edges facing downwardly, track means extending along said juxtaposed edges of said sheets, an automatic arc welding head movably mounted on said track means underneath said supporting means and arranged and adapted to feed a consumable welding electrode upwardly toward said juxtaposed edges to deposit weld metal therealong, means for attachment to said pair of metallic sheets, and means pivotally mounting said attachment means about an axis generally parallel to said juxtaposed edges for rotating said pair of metallic sheets about said axis to position an unwelded edge of one of them in position for welding to a like edge of another sheet.

3. Apparatus for arc welding together a pair of metallic sheets of substantial thickness having planar side portions comprising, in combination, means for supporting the sheets in angular relation with an edge of one planar side portion in engagement throughout its length with the corresponding edge of the other planar side portion of the sheet and these planar side portions facing downwardly, track means extending along said downwardly facing planar side portions of the sheets, and an automatic arc welding head movably mounted on said track means underneath said supporting means and arranged and adapted to feed a consumable welding electrode upwardly toward said planar side portions of the sheets to deposit weld metal therealong.

4. Apparatus for arc welding together a pair of metallic sheets of substantial thickness having planar side portions comprising, in combination, upwardly facing gauge block means for receiving and accurately positioning downwardly facing planar side portions of the sheets, clamp means for securely holding the sheets in angular relation with an edge of one planar side portion in engagement throughout its length with the corresponding edge of the planar side portion of the other sheet, means for removing said gauge block means from engagement with said planar side portions, track means extending along said downwardly facing planar side portions of the sheets, and an automatic arc welding head movably mounted on said track means underneath said supporting means and arranged and adapted to feed a consumable welding electrode upwardly toward said planar side portions of the sheets to deposit weld metal therealong.

5. Apparatus for arc welding together a pair of metallic sheets of substantial thickness having planar side portions comprising, in combination, a plurality of upwardly facing gauge blocks for receiving and accurately positioning downwardly facing planar side portions of the sheets, clamp means for securely holding the sheets in angular relation with an edge of one planar side portion in engagement throughout its length with the corresponding edge of the planar side portion of the other sheet, track means extending along said downwardly facing planar side portions of the sheets, an automatic arc welding head movably mounted on said track means underneath said supporting means and arranged and adapted to feed a consumable welding electrode upwardly toward said planar side portions of the sheets to deposit weld metal therealong, support means individual to each of said gauge blocks and operating means therefor to move them individually out of operative relation with said planar side portions, and means responsive to movement of said welding head along said track means for effecting sequentially the operation of said operating means to withdraw said gauge blocks from their operative positions.

6. Apparatus for arc welding together the juxtaposed edges of a pair of metallic sheets comprising, in combination, a pair of horizontally extending horizontally spaced back up bars having angularly inclined upwardly facing surfaces for receiving thereon the sheets with their juxtaposed edges facing downwardly and urge into abutting relation therealong by gravity, clamp means for reacting against each sheet in a direction to urge the juxtaposed edges thereof into engagement in addition to the force of gravity exerted thereon, and means for arc welding together from underneath the juxtaposed edges of the sheets while they are held in juxtaposed relation by the combined forces of gravity and said clamp means.

7. Apparatus for arc welding together the juxtaposed edges of a pair of metallic sheets comprising, in combination, a pair of horizontally extending horizontally spaced back up bars having angularly inclined upwardly facing surfaces for receiving thereon the sheets with their juxtaposed edges facing downwardly and urged into abutting relation therealong by gravity, clamp means for reacting against each sheet in a direction to urge the juxtaposed edges thereof into engagement in addition to the force of gravity exerted thereon, means for arc welding together from underneath the juxtaposed edges of the sheets while they are held in juxtaposed relation by the combined forces of gravity and said clamp means, a pair of handling bars arranged and adapted to be secured to opposite ends of the metallic sheets, and means for supporting said handling bars intermediate their ends to permit rotation thereof and of the sheets about an axis parallel to the welded juxtaposed edges thereof.

References Cited in the file of this patent

UNITED STATES PATENTS

| | | |
|---|---|---|
| 1,540,705 | Noble | June 2, 1925 |
| 1,838,899 | Arnold | Dec. 29, 1931 |
| 1,851,563 | Chapman | Mar. 29, 1932 |
| 2,030,689 | Dorrat | Feb. 11, 1936 |
| 2,303,720 | Berkeley | Dec. 1, 1942 |
| 2,680,182 | Chambers | June 1, 1954 |
| 2,716,692 | Williams et al. | Aug. 30, 1955 |
| 3,002,085 | Lobosco et al. | Sept. 26, 1961 |
| 3,068,351 | Longenecker et al. | Dec. 11, 1962 |